(12) United States Patent
Waldron et al.

(10) Patent No.: US 7,987,130 B2
(45) Date of Patent: Jul. 26, 2011

(54) METHODS AND COMPUTER SOFTWARE APPLICATIONS FOR SELECTING SECURITIES FOR AN INVESTMENT PORTFOLIO

(75) Inventors: Dan Waldron, Naperville, IL (US); David McGarel, Western Springs, IL (US); Robert Hensley, Wheaton, IL (US); Chris Peterson, Arlington Heights, IL (US)

(73) Assignee: First Trust Portfolios L.P., Lisle, IL (US)

( * ) Notice: Subject to any disclaimer, the term of this patent is extended or adjusted under 35 U.S.C. 154(b) by 425 days.

(21) Appl. No.: 12/106,672

(22) Filed: Apr. 21, 2008

(65) Prior Publication Data

US 2008/0270317 A1 Oct. 30, 2008

Related U.S. Application Data

(60) Provisional application No. 60/912,918, filed on Apr. 19, 2007.

(51) Int. Cl.
*G06Q 40/00* (2006.01)

(52) U.S. Cl. .................. 705/36 R; 705/35; 705/37

(58) Field of Classification Search .............. None
See application file for complete search history.

(56) References Cited

U.S. PATENT DOCUMENTS

| | | | |
|---|---|---|---|
| 6,317,726 B1 * | 11/2001 | O'Shaughnessy | 705/36 R |
| 7,099,838 B1 * | 8/2006 | Gastineau et al. | 705/36 R |
| 7,206,760 B1 * | 4/2007 | Carey et al. | 705/35 |
| 7,558,751 B2 * | 7/2009 | Sauter et al. | 705/36 R |
| 7,593,878 B2 * | 9/2009 | Blitzer et al. | 705/35 |
| 7,769,653 B2 * | 8/2010 | Rousseau et al. | 705/35 |
| 2002/0052820 A1 * | 5/2002 | Gatto | 705/36 |
| 2002/0116310 A1 * | 8/2002 | Cohen et al. | 705/36 |
| 2005/0060254 A1 * | 3/2005 | Jones | 705/36 |
| 2005/0246255 A1 * | 11/2005 | Rousseau et al. | 705/35 |
| 2007/0299787 A1 * | 12/2007 | Shelor et al. | 705/36 R |
| 2008/0243721 A1 * | 10/2008 | Joao | 705/36 R |
| 2009/0198631 A1 | 8/2009 | McGarel et al. | |
| 2009/0307148 A1 * | 12/2009 | Cardoza et al. | 705/36 R |

OTHER PUBLICATIONS

First Trust Exchange-Traded Alphadex Fund, et al.—N-1A/A—on Mar. 14, 2007; SEC Info (hereinafter "First Trust"); an excerpt containing seven (7) selected pages; source www.secinfo.com.*

Barclays Global Investors Announces the Launch of the First Style-Based International Exchange Traded Funds for U.S. Investors; Business Wire; Aug. 5, 2005; 2-pages.*

Drift Happens; Israelsen, Craig L; Financial Planning, v 29, n. 11; Nov. 1999; 6-pages.*

Style and de Stijl, or Morningstar and Mondrian: use and misuse of style boxes; Journal of Investing, v 14, n 4; Dec. 2005; 14-pages.*

(Continued)

*Primary Examiner* — Alexander Kalinowski
*Assistant Examiner* — Gregory Johnson
(74) *Attorney, Agent, or Firm* — McAndrews, Held & Malloy, Ltd.

(57) ABSTRACT

Provided are methods and computer software applications for generating a stock portfolio, and/or enhanced stock index, through using a plurality of growth factors and a plurality of value factors to rank stocks, and for constructing investment vehicles based on the stock portfolio. The method, software application, or computer apparatus of the present technology employs a novel stock selection strategy to select stocks from a pre-selected universe of securities such as a commercially available stock market index in order to create a stock portfolio, and/or enhanced stock index, and a fund based thereon that can generate positive alpha as compared to a fund based on the pre-selected universe of securities.

22 Claims, 2 Drawing Sheets

OTHER PUBLICATIONS

Thinking outside the Box; Schiffres, Manuel; Kiplinger's Personal Finance Mutual Funds; Spring 2006; 5-pages.*

Introducing the New S&P U.S. Style Indices; Standard & Poor's; Oct. 6, 2005; 6-pages.*

SEC Info—First Trust Exchange-Traded Alphadex Fund, et al.—N-1A/A—on Mar. 14, 2007; www.secinfo.com; Mar. 14, 2007, 7-pages (EXCERPT).*

* cited by examiner

METHODS AND COMPUTER SOFTWARE APPLICATIONS FOR SELECTING SECURITIES FOR AN INVESTMENT PORTFOLIO

RELATED APPLICATIONS

This application claims priority to U.S. Provisional App. Ser. No. 60/912,918, filed Apr. 19, 2007. The content of U.S. Provisional App. Ser. No. 60/912,918 is incorporated herein by reference in its entirety.

BACKGROUND OF THE INVENTION

The invention relates to portfolio construction and management, and more specifically, relates to methods and computer software applications for selecting and weighting securities in order to construct an investment portfolio, or an enhanced stock market index. The portfolio can be used to create a closed-end fund, a traditional mutual fund, a separately managed account, a unit investment trust or an exchange-traded fund (ETF). Additionally, an enhanced index may be used as the basis for an index tracking fund.

Professional investment managers often follow predetermined investment decision-making criteria or strategies for selecting the stocks for the portfolio. While the investment philosophies that inform stock selection strategies differ significantly, the strategies generally have two key inherent qualities:

1. Sound Analysis: The strategy seeks to out-perform specified indices by selecting portfolios by evaluating relevant, sound, fundamental and technical information that can reasonably be expected to be material to future returns. The spirit of this quality is captured by this quote from Benjamin Graham, mentor to legendary investor Warren Buffett:

> The individual investor should act consistently as an investor and not as a speculator. This means that he should be able to justify every purchase he makes and each price he pays by impersonal, objective reasoning that satisfies him that he is getting more than his money's worth for his purchase.

2. Discipline: A rational investment decision-making process determines which stocks are chosen for the portfolio; emotional judgments should be avoided. Warren Buffett's words exhort investors to be mindful of irrational tendencies of human nature:

> Investors should remember that excitement and expenses are their enemies. And if they insist on trying to time their participation in equities, they should try to be fearful when others are greedy and greedy when others are fearful.

Developing a strategy that robustly meets these criteria can be very difficult, if not elusive. The best of intentions are often thwarted because the stock market is subject to waves of optimism and pessimism. Fear and greed affect the market. Once again, Benjamin Graham states:

> Most of the time common stocks are subject to irrational and excessive price fluctuations in both directions as the consequence of the ingrained tendency of most people to speculate or gamble give way to hope, fear and greed.

In addition to greed and fear, which call the discipline of the investment process into question, various other behavorial biases can impede the other pillar of quality investment decision-making, sound analysis. One example is the "affect" bias, described here by prominent social psychologist Robert Zajonc:

> We sometimes delude ourselves that we proceed in a rational manner and weigh all the pros and cons of the various alternatives. But this is rarely the case. Quite often "I decided in favor of X" is no more than "I liked X." We buy the cars we "like," choose the jobs and houses we find "attractive," and then justify these choices by various reasons.

This bias can result in the tendency to irrationally favor stocks with more familiar names in glamorous industries like fashion or technology and eschew boring industries like paper or chemical processing. Other examples are "overconfidence" where decision makers are overly confident in their own forecasts and "conservatism" where investors are reluctant to update their forecasts in response to new information. Overconfidence results in investors mistakenly believing that fundamental results such as earnings will fall into too narrow a possible range of values around their forecasts. Conservatism will result in investors being too slow to recognize a change in the direction of the underlying fundamentals of a firm, overlooking business turnarounds or steady declines in the face of obvious evidence of these occurrences.

As discussed earlier, by their nature, human beings have great difficulty in selecting portfolios solely on the basis of well-reasoned analysis in a disciplined non-emotional manner. Objective, quantitative approaches based on intuitive financial theory and empirical evidence can mitigate the shortcomings of the human element in investment decision-making. Earlier quantitative investment strategies have been illustrated in U.S. Pat. No. 5,978,778 issued to O'Shaughnessy on Nov. 2, 1999 and U.S. Pat. No. 5,132,899 issued to Fox on Jul. 21, 1992.

SUMMARY OF THE INVENTION

In today's financial marketplace, a well-maintained portfolio is vital to any investor's success. Sound portfolio construction begins with aligning investment goals to appropriate investment strategies such as asset allocation, diversification, cost control and risk management and applying periodic portfolio rebalancing.

The present invention provides methods, computer software, and hard drive apparatus, for selecting and weighting securities and creating investment portfolios, including enhanced index funds. The enhanced index funds (e.g., enhanced ETFs) of the present technology are designed to track the performance of enhanced indices, generated in accordance with the methods of the present technology.

A rules-based method and computer software application of the present invention consistently identifies and selects stocks within a defined market segment. The invention identifies stocks within a universe of securities (such as a traditional broad-based index or another predetermined universe) that enable the greatest potential for capital appreciation. In accordance with at least one embodiment, the method of the presently described technology is itself inherently passive. In accordance with this embodiment, no active judgment is made when the method or the computer software application is evaluating stocks, and every step in the process is driven by a transparent, repeatable quantitative process.

In one aspect, a computer generates a stock portfolio by:
(1) receiving into a database, information of all stocks that are constituents of a pre-selected universe of securities (e.g., a pre-selected broad-based index), wherein the universe of securities preferably comprises growth, value, and blend stocks, and wherein the information includes identity, growth data, and value data of a stock, as of a selection date;

(2) scoring each of the stocks using a plurality of growth factors and a plurality of value factors to generate a growth score and a value score for each stock;

(3) determining a selection score and, optionally, a style and/or sector for each stock, wherein the style of each stock is preferably either value or growth;

(4) selecting eligible stocks for a target stock portfolio, preferably, based on their styles determined in step (3), wherein only value stocks are eligible for a value stock portfolio, only growth stocks are eligible for a growth stock portfolio, and all stocks are eligible for a broad-based "core" stock portfolio;

(5) ranking the stocks eligible for the target stock portfolio from the best to the worst selection scores;

(6) eliminating a pre-determined percentage of the worst ranking stocks (e.g., the bottom 25%);

(7) dividing the remaining stocks into a plurality of sub-groups (e.g., quintiles) based on their rankings; and (8) generating the target stock portfolio by weighting the remaining stocks according to the sub-groups they are in, wherein the sub-groups (e.g., quintiles) with higher rankings receive more weight within the target stock portfolio, and each stock is equally-weighted within its sub-group (e.g., quintile).

To ensure a consistent and accurate representation of the market segment, the composition and weights of the stocks in the target stock portfolio are preferably adjusted, reconstituted and/or rebalanced periodically (e.g., quarterly).

In step (2) above, preferably, each stock initially is given a numeric growth or value rank for every growth factor and every value factor, and then all growth ranks of a stock are summed up to generate a numeric combined growth rank of the stock, and all value ranks of the stock are summed up to generate a numeric combined value rank of the stock. The combined growth rank and combined value rank of the stock correspond to the growth score and the value score of that stock, respectively. Examples of growth factors that can be used to evaluate the stocks include, but are not limited to, three month price appreciation, six month price appreciation, 12 month price appreciation, one year sales growth, sales-to-price ratio, one year change in return on assets, sustainable growth rate, one year earnings growth, one year cash flow growth, market implied earnings surprise, and combinations thereof. Examples of value factors include, but are not limited to, book value-to-price ratio, cash flow-to-price ratio, return on assets, earnings to price ratio, dividend yield, and combinations thereof. In accordance with at least one embodiment, growth factors and value factors identified in the previous sentences are used to evaluate each stock in the broad-based index or the applicable universe.

In step (3) above, in accordance with one embodiment of the present invention, stocks in the broad-based index or applicable universe are first separated into growth, value and blend segments based on value and growth style classifications corresponding to the broad-based index or applicable universe, if they are available. A stock classified by the corresponding value and growth style classifications solely as a growth stock is given its growth score as the selection score, and is determined to be a growth stock. A stock classified by the corresponding value and growth style classifications solely as a value stock is given its value score as the selection score, and is determined to be a value stock. Blend stocks (i.e., stocks allocated to both the available value and growth style classifications) are given the better of their two scores, and determined to be value or growth stocks according to their better scores. For example, a blend stock having a better value score than growth score receives the value score as its selection score, and is determined to be a value stock. If no corresponding value and growth style classifications are available, then all stocks are given the better of the two scores as their selection scores, and designated as value or growth stocks according to their better scores.

In step (4) above, in accordance with at least one embodiment of the present technology, the stocks are further separated into their appropriate sectors as determined by the index provider, for example, in the event of a sector-based portfolio. Then the pre-determined percentage of the lowest ranking stocks (e.g., the bottom 25%) in each sector are eliminated in step (6).

In step (8) above, after the remaining stocks are divided into quintiles in step (7), for example, they can be weighted as follows: the top ranked quintile receives 5/15 (33.3%) of the index weight by capitalization with each successive quintile receiving 4/15 (26.7%), 3/15 (20.0%), 2/15 (13.3%) and 1/15 (6.7%), of the index weight, respectively.

The target stock portfolio generated by the method in accordance with one embodiment of the present technology as described above can be used to construct different investment vehicles such as enhanced index funds, variable annuities, separately managed accounts, ETFs (whether index based or managed), and unit investment trusts. An enhanced index can also be calculated by the method described above. ETFs employing the enhanced method of the present technology are currently available under the trademark AlphaDEX™. This family of ETFs is advised by First Trust Advisors L.P., Lisle, Ill.

DETAILED DESCRIPTION OF THE PREFERRED EMBODIMENT

Various exemplary embodiments of the present invention are discussed in detail below. While specific implementations are discussed, it should be understood that this is done for illustration purposes. Other components and configurations may be used without departing from the spirit and scope of the present invention.

The presently described embodiments relate generally to portfolio construction and management. More specifically, the presently described embodiments relate to methods and computer software applications for generating securities portfolios, and enhanced indices, using a plurality of growth factors and a plurality of value factors to rank stocks. The methods of the present technology employ a novel stock selection strategy to select stocks from a commercially available, preferably, prominent, stock market index or from another pre-selected universe of securities in order to create an investment portfolio (e.g., one that can be traded as an ETF) that can generate positive alpha as compared to its benchmark.

As used herein, a stock market "index" is (1) a listing of stocks wherein each stock carrying a certain weight of the index forms a component of the index and (2) a statistic reflecting the composite value of all the components in the index.

As used herein, "alpha" is an indication of how much an investment outperforms or underperforms on a risk adjusted basis relative to its benchmark. Alpha is a measure of the portion of a return arising from non-market risk. For example, if an investment returns more than what one would expect given the market for the asset class it is invested in, it has a positive alpha. Conversely, if an investment returns less than the asset class, it has a negative alpha. In other words, alpha is an indication of how much an investment outperforms or underperforms relative to its benchmark index.

Commercially available stock market indices are supplied by statistical bureaus such as Standard & Poor's (e.g., the S&P 500 Index), The Frank Russell Company of Tacoma, Wash. (e.g., the Russell 1000 Index), the FTSE Group of London, UK (e.g., the FTSE 100 Index), and the Dow Jones & Company of New York, N.Y. (e.g., the Dow Jones Industrial Average Index, i.e., DJIA). They are generally all-inclusive of the securities within their defined markets or market segments. In most cases, stock market indices may include each component security in the proportion that its market capitalization bears to the total market capitalization of all of the component securities (for examples, the S&P 500, S&P 400 MidCap, and S&P 600 SmallCap Indices). A common exception to market capitalization weighting is equal weighting of the included securities (for example the Value Line Index or the Standard & Poor's 500 Equal Weighted Stock Index, which includes all of the stocks in the S&P 500 Index on a list basis; each stock is given equal weighting as of a designated day each year) and share price weighting, in which share prices are simply added together and divided by some simple divisor (for example, the Dow Jones Industrial Average Index). Conventionally, passive investment portfolios are built based on an index that uses market capitalization weighting, equal weighting, or share price weighting to weight the component securities in the index.

A traditional passive portfolio based on a commercially available index may also reflect the entire market or segment the index reflects. Often, every component security making up an index is held in the passive portfolio. Sometimes statistical modeling is used to create a portfolio that duplicates the profile, risk characteristics, performance characteristics, and securities weightings of an index, without actually owning every security included in the index. Sometimes statistical modeling is used to create the index itself such that it duplicates the profile, risk characteristics, performance characteristics, and securities weightings of an entire class of securities.

In accordance with some embodiments, the methods and computer software applications of the presently described technology refer to commercially available indices as benchmark indices, and build custom "enhanced" indices with fundamental metrics other than market capitalization weighting, price weighting or equal weighting. The methods and computer software applications of the presently described technology also use additional filters to eliminate securities likely to reduce performance that would be otherwise included in traditional indices.

In accordance with some embodiments, the method of the present technology starts with all stocks making up an applicable commercially available stock market index, for example, a broad-based index. Examples of indices that can be used include, but are not limited to, S&P 500 Index, S&P MidCap 400 Index, S&P SmallCap 600 Index, British FTSE 100 Index, French CAC 400 Index, German DAX Index, Japanese Nikkei Index, Hong Kong Hang Seng Index, S&P 1500 Index, S&P Global 1200 Index, Russell 1000 Index, Russell 3000 Index, and Russell 2000 Index.

Alternatively, in accordance with some other embodiments, the method of the present technology starts with constituents of another pre-selected universe of securities. Such a universe of securities can be selected by a fund manager, for example.

Figure 1:
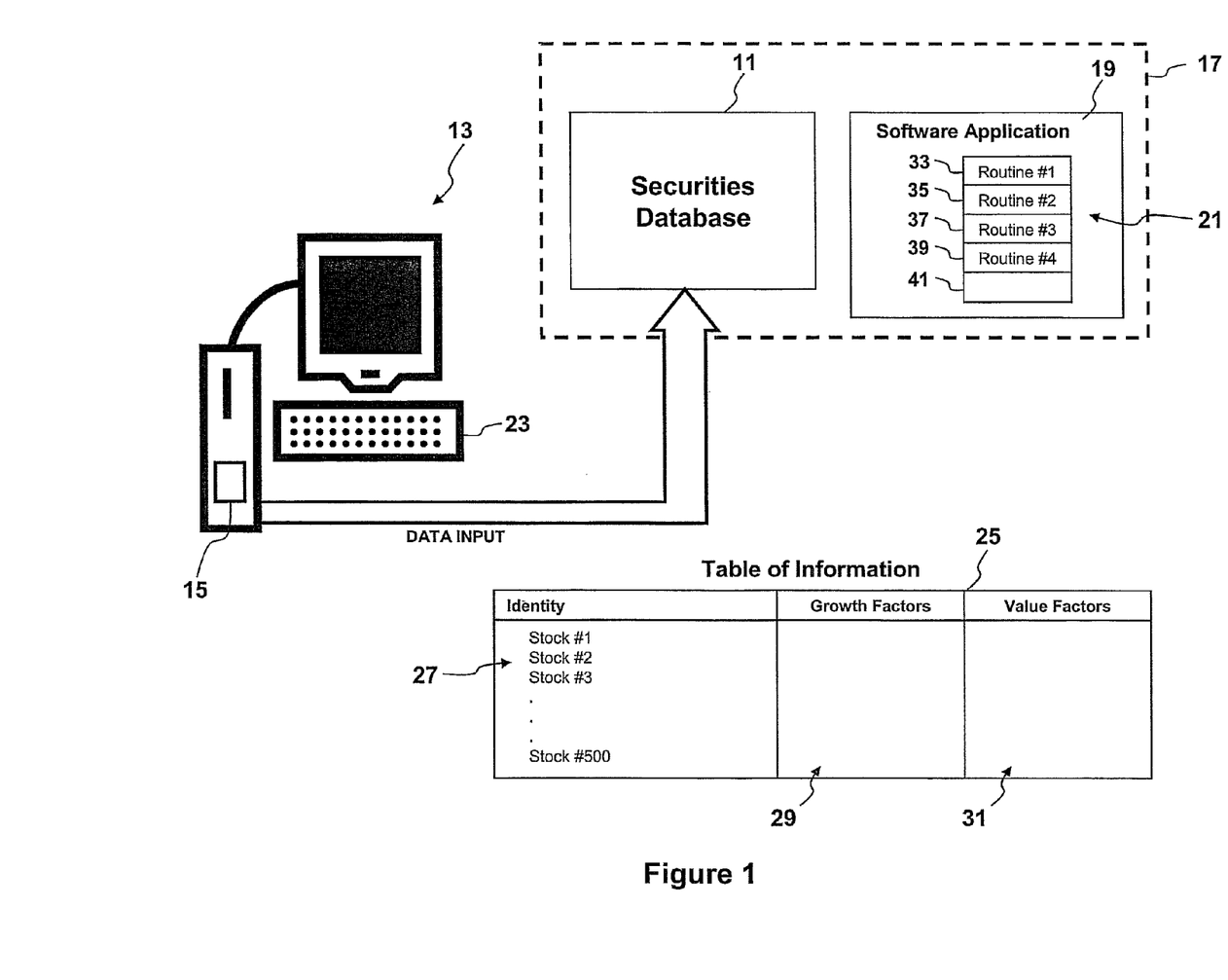
FIG. 1 is a block diagram of a structure embodiment according to the present invention.

Referring now to the FIG. 1, a securities database 11 receives input of data using a computing system 13 (e.g., a conventional PC computer standing alone or connected to a server (not shown)). Computing system 13 comprises at least a processor 15 and a memory 17. Memory 17 stores both securities database 11 and a computer software application 19. Computer software application 19 comprises a plurality of instruction routines 21, which are executed by processor 15 to carry out particular steps in the method of the presently described technology.

Data may be manually entered into database 11 via (1) keyboard 23 which is connected to processor 15, (2) download from an internet server (not shown), or (3) transfer from a local storage medium (not shown), for example. The data which is input to database 11 may include, the names of, or a representation of, the constituents forming a pre-selected broad-based index (i.e., the stocks forming the basis of the pre-selected stock market index) or another pre-selected universe of securities.

For example, the five hundred stocks that make up the S&P 500 Index can be used to form the data in database 11. A data entry person can make use of a table 25, or the like, to key-in the data using keyboard 23, i.e., data entered by keyboard 23 is obtained by processor 15 and loaded into database 11. Table 25 includes a listing 27 of each of the 500 stocks. Alternatively, the data may be downloaded into database 11 from another server or memory, or from a feed stream directly transmitted from Standard & Poor's.

As described above, the S&P 500 Index is a cap-weighted index that is based on 500 stocks of generally Large-Cap corporations chosen for market size, liquidity, and economic sector representation. In this example, the names of the 500 stocks, or their symbols, or other representative indicia, are stored in database 11 to identify a universe of securities.

In addition to the identity of the stocks, other data relating to each stock as of the close on a selection date (e.g., the last business day of each calendar quarter) can also be entered and stored in database 11 in association with its respective stock name. Such other data may be taken from table 25, or the like, and includes growth data represented by a set of growth factors 29 and value data represented by a set of value factors 31, using keyboard 23 for each stock. Again, the data entry person may make use of Table 25 to key-in the other data so as to store the other data in database 11, or such other data may be downloaded to database 11.

In accordance with at least one embodiment of the present technology, the growth factors 29 that are characteristic of the stocks in database 11 include, but are not limited to: (1) three month price appreciation, (2) six month price appreciation, (3) 12 month price appreciation, (4) sales-to-price ratio, (5) one year sales growth, (6) one year change in return on assets, (7) sustainable growth rate, (8) one year earnings growth, (9) one year cash flow growth, and (10) market implied earnings surprise. The value factors that are characteristic of the stocks in database 11 in accordance with at least one embodiment of the present technology include, but are not limited to: (1) book value-to-price ratio, (2) cash flow-to-price ratio, (3) return on assets, (4) earnings to price ratio and (5) dividend yield.

"Sales-to-price ratio," or S/P ratio, is a valuation metric for stocks. It can be calculated, for example, by dividing the company's total sales over the 12 months preceding the selection date by a company's market capitalization (the number of shares multiplied by the share price) as of the close on the selection date. In accordance with one embodiment, the greater a stock's S/P ratio is, the better rank that stock gets in the ranking step of the present technology. It can be calculated, equivalently, by dividing the per-share revenue over the 12 months preceding the selection date by the per-share stock price as of the close on the selection date. This calculation, may be performed by processor 15 using component values entered into database 11, and such calculated factors may be stored in database 11. Alternatively, the calculated factors may be entered directly to the database, if they are pre-calculated by hand or machine, or are available from a data provider. Such pre-calculated factors are shown at 29, 31 in table 25.

"Sustainable growth rate" can be calculated, for example, by multiplying return on equity (ROE) times the retention ratio (RR). ROE is calculated as the sum of the last 4 quarters of income before extraordinary items, less preferred dividend requirements, divided by latest quarterly reported common shareholders equity. RR is one minus the ratio of dividends paid per share over the last four quarters divided by the sum of fully diluted earnings per share over the same period.

"One year earnings growth" is year over year change in quarterly earnings per share.

"One year cash flow growth" is year over year change in quarterly cash flow per share.

"Market implied earnings surprise" is the percentage change in price over a five (5) day period measured from closing price, two (2) trading days before the last earnings report date, to closing price, two (2) days after the report date.

"Earnings to price ratio" is the sum of fully diluted earnings per share over the last four quarters divided by the latest closing price.

"Dividend yield" is indicated dividends per share over the next year divided by current share price.

"Book value-to-price ratio," or B/P ratio is a financial ratio used to compare a company's book value to its current market price. It can be calculated by, for example, dividing the company's total book value from its balance sheet as of the close on the selection date by the company's market capitalization as of the close on the selection date. It can also be calculated using per-share values by dividing the company's book value per share by the share price (i.e. its book value divided by the share price) as of the close on the selection date. In accordance with one embodiment, the greater a stock's B/P ratio is, the better rank that stock gets in the ranking step of the present technology.

"Cash flow-to-price ratio," or CF/P ratio, is a ratio used to compare a company's cash flow to its market value. It can be calculated by dividing the company's operating cash flow in the 12 months preceding the selection date by the company's market capitalization as of the close on the selection date or, equivalently, by dividing the per-share operating cash flow by the per share stock price. In accordance with one embodiment, the greater a stock's CF/P ratio is, the better rank that stock gets in the ranking step of the present technology.

"Return on assets" (ROA) shows how efficient a company's assets are in generating profits. As used herein, ROA over the last four quarters, for example, can be measured by quarterly income, either before or after, extraordinary items, less preferred dividends, divided by average assets value over the past four quarters. In accordance with one embodiment, the higher a stock's ROA percentage is, the better rank that stock gets in the ranking step of the present technology.

Figure 2:
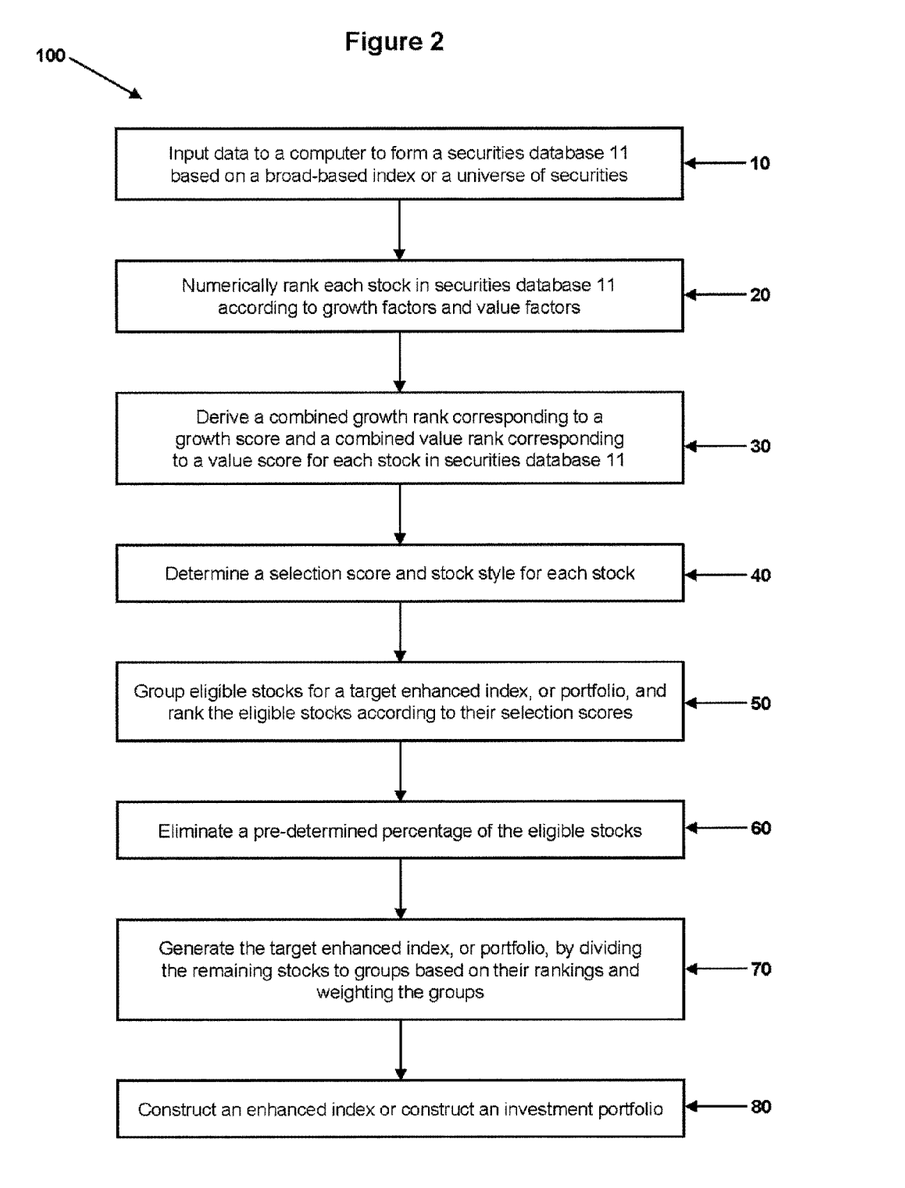
FIG. 2 is a schematic flow chart depicting the program flow of a software application in the structure of FIG. 1.

Referring again to FIG. 1, software application 19 is executed by processor 15 in order to carry out a program flow 100, as shown in FIG. 2, in accordance with one embodiment of the present technology.

Referring to FIG. 2, in step 20 of flow 100, all stocks in securities database 11 (e.g., the S&P 500 stocks) are given at least one numerical rank according to a set of growth and value factors. For example, each stock is ranked from 1 to 500 for each of the ten growth factors and the five value factors described above. A smaller number of factors may be used in Step 20. For example, the first five growth factors and the first three value factors may be used in one embodiment. A routine 33 (FIG. 1) in software application 19 may be called by processor 15 and executed so as to numerically rank each stock by a separate factor. If a factor of a stock cannot be computed or used to rank the stock, that stock is given the lowest possible ranking for that factor.

Each stock in database 11 is assigned a plurality of (e.g. five) numeric growth factors ranks (i.e., each numeric rank is a number between 1 and 500), and a plurality of (e.g., three) numeric value factors ranks (i.e., each numeric rank is a number between 1 and 500). The plurality of assigned numeric scores for each stock are stored in database 11, by operation of routine 33. In accordance with one embodiment, the lower the number, the better the ranking. This means a rank of 31 is better than a rank of 95, and represents a more favored stock. As will suggest itself, one can instead assign a larger number to a stock with a better ranking than to a stock with a lower ranking.

Referring again to FIG. 2, in step 30 of flow 100, each stock is assigned (1) a combined growth rank and (2) a combined value rank. The combined growth rank corresponds to a growth score, and is calculated by summing up the plurality of (e.g., five) numeric growth factor ranks of the stock. Thus, in the example, each stock will have a combined numeric growth rank between 5 to 2500. The growth score of each stock is determined by ranking each stock in the universe by its combined growth rank. The combined value rank corresponds to a numeric value score, and is calculated by summing up the plurality of (e.g., three) numeric value factor ranks of the stock. Thus, in the example, each stock will have a combined numeric value rank between 3 to 1500. The value score of each stock is determined by ranking each stock in the universe by its combined value rank.

A routine 35 (FIG. 1) in the computer software application 19 is used to calculate the combined rankings. For example, routine 35 will obtain from database 11 each of the numeric ranks for a stock and add together the growth rankings and add together the value rankings. Routine 35 will do this for each stock so that each stock will have a combined numeric growth rank in the range of from 5 to 2500, in the example, and each stock will have a combined numeric value rank in the range of from 3 to 1500, in the example. Routine 35 will store these combined rankings in database 11.

In accordance with some embodiments, the same routine 35 or a different routine (not shown) in the computer software application 19 can then use the combined numeric growth rank to give each stock a growth score by ranking each stock in the universe by its combined numeric growth rank. In addition, software application 19 can use the combined numeric value rank to give each stock a value score by ranking each stock in the universe by its combined numeric value rank.

For example, five of the 500 stocks from the S&P 500 Index may end up with the following rankings for each growth factor as shown in Table 1 below. In Table 1, "3-M PA" refers to three month price appreciation; "6-M PA" refers to six month price appreciation; "12-M PA" refers to 12 month price appreciation, "SPR" refers to the sales-to-price ratio; and "SG" refers to one year sales growth, of a stock as of the close on the selection date.

TABLE 1

| Stock No. | Stock Name | Growth Factor 1 (3-M PA) | Growth Factor 2 (6-M PA) | Growth Factor 3 (12-M PA) | Growth Factor 4 (SPR) | Growth Factor 5 (SG) | Combined Growth Rank | Growth Score |
|---|---|---|---|---|---|---|---|---|
| 1 | FII | 2 | 21 | 8 | 7 | 4 | 42 | 8 |
| ... | ... | ... | ... | ... | ... | ... | ... | ... |
| 50 | MMC | 75 | 79 | 62 | 100 | 25 | 341 | 65 |
| ... | ... | ... | ... | ... | ... | ... | ... | ... |
| 100 | NFB | 270 | 274 | 295 | 300 | 315 | 1454 | 291 |
| ... | ... | ... | ... | ... | ... | ... | ... | ... |
| 300 | WM | 451 | 402 | 391 | 442 | 375 | 2472 | 415 |
| ... | ... | ... | ... | ... | ... | ... | ... | ... |
| 500 | TROW | 300 | 214 | 232 | 218 | 196 | 1160 | 232 |

As shown in Table 1, stock FII ends up with a combined growth rank of 42, which corresponds to a final growth ranking (i.e., growth score) of 8 among the 500 stocks; stock MMC ends up with a combined growth rank of 341, which corresponds to a final growth ranking (i.e., growth score) of 65 among the 500 stocks; stock NFB ends up with a combined growth rank of 1454, which corresponds to a final growth ranking (i.e., growth score) of 291 among the 500 stocks; stock WM ends up with a combined growth rank of 2472, which corresponds to a final growth ranking (i.e., growth score) of 415 among the 500 stocks; and stock TROW ends up with the a combined growth rank of 1160, which corresponds to a final growth ranking (i.e., growth score) of 232 among the 500 stocks.

The same five stocks may end up with the following rankings for each value factor as shown in Table 2 below. In Table 2, "B/P" refers to book-to-price value ratio; "CF/P" refers to Cash flow-to-price ratio; and "ROA" refers to return on assets, of a stock as of the close on the selection date. As shown in Table 2, in this example, stock FII ends up with a combined value rank of 941, which corresponds to a final value ranking (i.e., value score) of 318 among the 500 stocks; stock MMC ends up with a combined value rank of 1116, which corresponds to a final value ranking (i.e., value score) of 370 among the 500 stocks; stock NFB ends up with a combined value rank of 899, which corresponds to a final value ranking (i.e., value score) of 300 among the 500 stocks; stock WM ends up with a combined value rank of 41, which corresponds to a final value ranking (i.e., value score) of 15 among the 500 stocks; and stock TROW ends up with a combined value rank of 669, which corresponds to a final value ranking (i.e., value score) of 223 among the 500 stocks.

TABLE 2

| Stock No. | Stock Name | Value Factor 1 (B/P) | Value Factor 2 (CF/P) | Value Factor 3 (ROA) | Combined Value Rank | Value Score |
|---|---|---|---|---|---|---|
| 1 | FII | 302 | 321 | 318 | 941 | 318 |
| ... | ... | ... | ... | ... | ... | ... |
| 50 | MMC | 375 | 379 | 362 | 1116 | 370 |
| ... | ... | ... | ... | ... | ... | ... |
| 100 | NFB | 270 | 334 | 295 | 899 | 300 |
| ... | ... | ... | ... | ... | ... | ... |
| 300 | WM | 11 | 12 | 18 | 41 | 15 |
| ... | ... | ... | ... | ... | ... | ... |
| 500 | TROW | 225 | 214 | 230 | 669 | 223 |

Referring again to FIG. 2, in step 40 of flow 100, each stock in the securities database 11 will be assigned a selection score and a stock style. In this step, it is determined whether a stock is assigned its growth score as its selection score or is assigned its value score as its selection score. For example, if the S&P 500 Index is the pre-selected broad-based index used to identify the universe of stocks, then the S&P 500/Citigroup Growth Index and the S&P 500/Citigroup Value Index are used to identify the style for each stock.

The S&P 500/Citigroup Growth Index along with its counterpart, the S&P 500/Citigroup Value Index, were introduced by Standard & Poor's in December 2005. Previously, these indices were known as the S&P 500/Barra Growth and Value Indices. These S&P 500/Citigroup Indices are created by dividing the S&P 500 Index based upon seven different factors, four to determine value characteristics and three to determine growth characteristics. The companies are allocated to each index according to their growth or value characteristics, with about one-third being allocated to both the growth and value indices.

For an S&P 500 stock, if it has been classified by the S&P 500/Citigroup Indices solely as a growth or value stock, the stock is determined to have that style and receives the numeric score for that style as determined in step 30 as its selection score. If, however, an S&P 500 stock has been allocated to both the S&P 500/Citigroup Growth and Value Indices, the stock receives the better of the stock's growth score and value score determined in step 30 as its selection score, and is treated as belonging solely to the style associated with its better score.

Therefore, if some stocks allocated to both the S&P 500/Citigroup Growth and Value Indices (which can be referred to as blend stocks) have better growth scores than their value scores (as determined in step 30), they are determined to be growth stocks. On the other hand, those stocks allocated to both the S&P 500/Citigroup Indices and having value scores better than their growth scores are determined to be value stocks.

Using the five stocks identified in Tables 1 and 2 as an example, stocks FII and MMC, for example, have been classified by the S&P 500/Citigroup Indices as growth stocks and allocated in the S&P 500/Citigroup Growth Index. Stocks FII and MMC will be determined as growth stocks in step 40, and their growth scores of 8 and 65 will be determined as their selection scores, respectively. Stock WM, for example, has been classified as a value stock and allocated in the S&P 500/Citigroup Value Index. WM will be determined as a value stock in step 40, and its value score of 15 will be determined as its selection score. Stocks NFB and TROW have been allocated to both the S&P 500/Citigroup Growth and Value Indices. Stock NFB's growth score is 291, which is lower, and therefore better in this example, than its value score 300. Therefore, NFB will be determined as a growth stock, and its growth score 291 will be determined as its selection score. Stock TROW's value score is 223, which is lower, and therefore better in this example, than its growth score 232. Therefore, TROW will be determined as a value stock, and its value score 223 will be determined as its selection score. Table 3 below summarizes the styles and selection scores of the five stocks of this example.

TABLE 3

| Stock No. | Stock Name | Stock Style | Selection Score |
|---|---|---|---|
| 1 | FII | growth | 8 |
| ... | ... | ... | ... |
| 50 | MMC | growth | 65 |
| ... | ... | ... | ... |
| 100 | NFB | growth | 291 |
| ... | ... | ... | ... |
| 300 | WM | value | 15 |
| ... | ... | ... | ... |
| 500 | TROW | value | 223 |

According to one embodiment of the present technology, stocks FII, MMC, and NFB in this example will be eligible for an enhanced growth portfolio, but not for an enhanced value portfolio. On the other hand, stocks WM and TROW will be eligible for an enhanced value portfolio, but not for an enhanced growth portfolio. All five stocks, however, will be eligible for an enhanced portfolio based on the S&P 500 Index.

If there are no growth and/or value style indices corresponding to the stocks input into database 11, then in step 40, each stock in the securities database 11 can receive the better of the stock's growth score and value score as its selection score, for example, and be determined to be a growth stock if its growth score is better and a value stock if its value score is better.

A routine 37 in software application 19 will determine the style of each stock in database 11, as explained, such a determination may be based in reference to an index classification (or to some other known classification) or by a comparison of each stock's growth and value scores stored in database 11 (as the results of step 30).

Still referring to FIG. 2, in step 50, eligible stocks of a particular style are grouped together, and ranked according to their selection scores as determined in step 40. For example, if the stocks are to be grouped according to value, all stocks from the S&P 500 stocks that have been determined to be a value stock style in step 40 are grouped together. Then, using the selection scores determined in step 40 all stocks in the group are ranked according to their selection scores. For another example, if the stocks are to be grouped according to growth, all stocks that have been determined to be a growth stock style in step 40 are grouped together. Then, using their selection scores determined in step 40, the stocks in the group are ranked according to their selection scores. For yet another example, all 500 stocks may be placed in the group, and are ranked according to their selection scores. If two stocks, for example a value stock and a growth stock have the same selection score, the value stock is given preference.

A software application can break ties in accordance with at least one embodiment of the present technology, as follows: at the style level, for value stocks the tie breaker can be book-to-price value ratio and for growth stocks the tie breaker can be 6 month appreciation. Once a selection score has been determined for a stock (based on growth score for growth stocks and value score for value stocks) a predetermined number, for example, 0.5 can be added to the selection score for the growth stock. This has the effect of the value stock being ranked above the growth stocks when both have the same score and breaks all potential ties.

A routine 39 in software application 19 will first group all stocks according to a particular criteria, e.g., growth, value, or both. In accordance with some embodiments, the stocks can be further separated into appropriate sectors as determined by the index provider, for example. Then the routine 39 will rank those stocks in each group.

In step 60 of FIG. 2, a pre-determined percentage of the lowest ranking stocks (e.g., the bottom 25% of the grouped stocks) may be eliminated from the stock group. A routine 41 in software application 19 can carry out step 60 by counting the number of stocks in the group, determining a percentage of that number, and then eliminating that percentage according to ranks.

In step 70 of FIG. 2, the remaining stocks (e.g., the top 75% of the grouped stocks) forms a stock portfolio. In accordance with at least one embodiment, the stocks in the portfolio are divided into a plurality of sub-groups (e.g., quintiles) based on their rankings, and weighted according to the sub-groups they are in. The sub-groups with higher rankings receive more weight within the stock portfolio. In addition, stocks within each sub-group (e.g., quintile) are equally weighted. A routine 43 in software application can carry out step 70.

In one example, the stocks ranked in the bottom 25% of the grouped stocks are eliminated, and the remaining 75% stocks are divided into quintiles (five sub-groups) based on their rankings from step 50, which in turn are based on their selection scores from step 40. In this example, the top ranked quintile receives 5/15 (33.3%) of the portfolio weight with successive quintiles receiving 4/15 (26.7%), 3/15 (20.0%), 2/15 (13.3%), and 1/15 (6.7%), respectively.

If a target stock portfolio is based on a broader index that constitutes two or more component indices, the broader index can be enhanced directly according to flow 100 described above to generate the target stock portfolio. Alternatively, according to at least one embodiment of the present technology, each of the two or more component indices in the broader index can be enhanced separately according to flow 100 described above to generate two or more portfolio components. The two or more portfolio components can then be combined to form the target stock portfolio.

For example, the S&P 1500 core index consists of the S&P 400, 500, and 600 core indices, and the S&P/Citigroup 1500 Value or Growth index consists of the S&P/Citigroup 500, 400, and 600 Value or Growth indices. In accordance with one embodiment of the present technology, an enhanced index fund based on the S&P 1500 core, value, or growth index can be created by (1) enhancing each of the component indices using the flow 100 described above to generate three portfolio components; and (2) weighting the three portfolio components using the following weights: 50% for the portfolio component based on S&P 500 core, value or growth index, 30% for the portfolio component based on S&P 400 core, value or growth index, and 20% for the portfolio component based on S&P 600 core, value or growth index, to generate a target stock portfolio based on an enhanced S&P 1500 core, value, or growth index.

Referring to FIG. 2, in step 80, an investment vehicle such as a traditional mutual fund can be constructed based on the stock portfolio formed and weighted in step 70. Alternatively, referring again to FIG. 2, in Step 80, an enhanced index can also be calculated. In accordance with at least one embodiment, the stocks and their weights in the stock portfolio can be adjusted, rebalanced, and/or reconstituted periodically, for example, on the last business day of each calendar quarter. Changes can be effective, for example, at the open on the fourth business day or sixth business day of the following month.

If the existence or corporate structure of a stock in the target stock portfolio or enhanced index, as applicable, changes, the stocks and their weights in the stock portfolio, or enhanced index, as applicable, can be adjusted as necessary. For example, the stock of an acquired company can be deleted from the stock portfolio, or enhanced index, as applicable, at the close on the day the merger closes for both cash and stock deals. The acquired company's weight in the stock portfolio can be reallocated pro-rata among the remaining portfolio constituents, for example. For another example, in accordance with one embodiment, the stock of a spin-off is not included in the stock portfolio, or the enhanced index, as applicable, and the value of the spin-off can be reallocated to its parent company.

The target stock portfolio generated by the method in accordance with at least one embodiment of the present technology as described above can be used to construct different investment vehicles such as enhanced index funds, variable annuities, separately managed accounts, ETFs (whether index based or managed), unit investment trusts, etc.

One preferred family of investment vehicles to be constructed based on the present technology is that of ETFs. As described above, ETFs are a special category of mutual funds. They can provide an efficient and simple way for investors to buy and sell an entire basket of securities with a single transaction throughout the trading day. ETFs are built like a traditional mutual fund, but trade like a stock. They generally offer investors the advantages of lower costs and improved tax efficiency over traditional, mutual funds. The ETFs of the present technology are designed to track specific indices enhanced by the method of the present technology.

While the present technology has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed.

What is claimed is:

1. A method implemented by a computing system for generating a stock portfolio, comprising the steps of:
   (1) inputting information of all stock that are constituents of a pre-selected universe of securities into a database, wherein the information comprises identity, growth data, and value data of a stock, as of a selection date;
   (2) scoring each of the stocks in said database using a plurality of growth and value factors to generate a growth score and a value score for each stock;
   (3) determining a selection score and style for each stock, wherein the style of each stock is either value or growth;
   (4) selecting eligible stocks for a target stock portfolio based on their styles determined in step (3), wherein only value stocks are eligible for a value stock portfolio, only growth stocks are eligible for a growth stock portfolio, and all stocks are eligible for a broad-based stock portfolio;
   (5) ranking the stocks eligible for the target stock portfolio from the best to the worst selection scores;
   (6) eliminating a predetermined percentage of the lowest ranking stocks;
   (7) dividing the remaining stocks into a plurality of sub-groups based on their rankings; and
   (8) generating the target stock portfolio by weighting the remaining stocks according to the sub-groups they are in, wherein the sub-groups with higher rankings receive more weight within the target stock portfolio, and each stock is equally-weighted within its group;
wherein step (3) comprises:
determining whether value and growth style classifications corresponding to the pre-selected universe of securities are available; and
if there are corresponding value and growth style classifications available,
   a first segment of stocks that are classified by the corresponding growth and value classifications solely as growth stocks are given their growth scores as their selection scores, and they are determined to be growth stocks,
   a second segment of stocks that are classified by the corresponding growth and value classifications solely as value stocks are given their value scores as their selection score, and they are determined to be value stocks, and
   a third segment of stocks that are allocated to both the growth and value classifications are given the better of their two scores, and determined to be value or growth stocks according to their better scores,
if there are no corresponding value and growth style classifications available, then each stock is given the better of its value and growth scores, and determined to be a value or growth stock according to its better score; and
wherein at least each of steps (2) through (8) is performed by the computing system.

2. The method of claim 1, wherein at least one of the plurality of growth factors are selected from the group consisting of price appreciations, sales-to-price ratio, one year sales growth, one year change in return on assets, sustainable growth rate, one year earnings growth, one year cash flow growth, market implied earnings surprise; and wherein at least one of the plurality of value factors are selected from the group consisting of book value-to- price ratio, cash flow-to-price ratio, return on assets, earnings to price ratio and dividend yield.

3. The method of claim 1, wherein the plurality of growth factors comprise 3-month price appreciation, 6-month price appreciation, 12-month price appreciation, sales-to-price ratio, and one year sales growth; and wherein the plurality of value factors comprise book value-to-price ratio, cash flow-to-price ratio, and return on assets.

4. The method of claim 1, wherein the pre-determined percentage of the lowest ranking stocks to be eliminated are the bottom 25%.

5. The method of claim 1, wherein the remaining stocks are divided into quintiles.

6. The method of claim 5, wherein the top ranked quintile receives 5/15 (33.3%) of the weight within the portfolio with successive quintiles receiving 4/15 (26.7%), 3/15 (20.0%), 2/15 (13.3%), and 1/15 (6.7%), of the weight within the index, respectively.

7. The method of claim 1, further comprising the step of reconstituting and rebalancing the stocks and their weights in the target stock portfolio periodically.

8. The method of claim 1, wherein step (2) comprises:
assigning a numeric growth or value rank to each stock for every growth factor and every value factor;
summing up all growth ranks of a stock to generate a numeric combined growth rank for each stock;
ranking all stocks in the pre-selected universe of securities based on their numeric combined growth ranks to determine the growth score of each stock;
summing up all value ranks of the stock to generate a numeric combined value rank for each stock; and ranking all stocks in the pre-selected universe of securities based on their numeric combined value ranks to determine the value score of each stock.

9. The method of claim 1, wherein the pre-selected universe of securities is an index selected from the group consisting of S&P 500 Index, S&P MidCap 400 Index, S&P SmallCap 600 Index, British FTSE 100 Index, French CAC 400 Index, German DAX Index, Japanese Nikkei Index, Hong Kong Hang Seng Index, S&P 1500 Index, S&P Global 1200 Index, Russell 1000 Index, Russell 2000 Index, and Russell 3000 Index.

10. The method of claim 1, wherein the universe of securities is S&P 500 Index and the corresponding growth and value style classifications are S&P 500/Citigroup Growth Index and S&P 500/Citigroup Value Index.

11. The method of claim 10, wherein the target stock portfolio is a component of a second target stock portfolio.

12. The method of claim 11, wherein the second target stock portfolio comprises stocks selected from the stocks in S&P Composite 1500 Index, S&P Composite 1500/Citigroup Growth Index, or S&P Composite 1500/Citigroup Value Index.

13. The method of claim 1, further comprising the step of constructing an investment vehicle based on the target stock portfolio.

14. The method of claim 13, wherein the investment vehicle is an exchange-traded fund.

15. The method of claim 1, further comprising the step of calculating an enhanced index based on the target stock portfolio.

16. The method of claim 15, wherein the enhanced index is calculated by a first party different from a second party generating the target stock portfolio.

17. The method of claim 16, further comprising the step of constructing an exchange traded fund based on the enhanced index.

18. A non-transitory computer readable medium storing a computer software application for generating a stock portfolio, wherein the computer software application comprises a set of instructions that when executed by a computing system allows the computing system and a user of the computing system to implement the following steps:
(1) inputting information of all stock that are constituents of a pre-selected universe of securities into a database, wherein the information comprises identity, growth data, and value data of a stock, as of a selection date;
(2) scoring each of the stocks in said database using a plurality of growth and value factors to generate a growth score and a value score for each stock;
(3) determining a selection score and style for each stock, wherein the style of each stock is either value or growth;
(4) selecting eligible stocks for a target stock portfolio based on their styles determined in step (3), wherein only value stocks are eligible for a value stock portfolio, only growth stocks are eligible for a growth stock portfolio, and all stocks are eligible for a broad-based stock portfolio;
(5) ranking the stocks eligible for the target stock portfolio from the best to the worst selection scores;
(6) eliminating a predetermined percentage of the lowest ranking stocks;
(7) dividing the remaining stocks into a plurality of sub-groups based on their rankings; and
(8) generating the target stock portfolio by weighting the remaining stocks according to the sub-groups they are in, wherein the sub-groups with higher rankings receive more weight within the target stock portfolio, and each stock is equally-weighted within its group, wherein one or more of the above steps are performed by the computing system;
wherein step (3) comprises:
determining whether there are value and growth style classifications corresponding to the universe of securities available; and
if there are corresponding value and growth style classifications available,
a first segment of stocks that are classified by the corresponding growth and value classifications solely as growth stocks are given their growth scores as their selection scores, and they are determined to be growth stocks,
a second segment of stocks that are classified by the corresponding growth and value classifications solely as value stocks are given their value scores as their selection score, and they are determined to be value stocks, and
a third segment of stocks that are allocated to both the growth and value classifications are given the better of their two scores, and determined to be value or growth stocks according to their better scores,
if there are no corresponding value and growth style classifications available, then each stock is given the better of its value and growth scores, and determined to be a value or growth stock according to its better score.

19. The method of claim 1, wherein step (4) further comprises processing data in the database for grouping eligible securities according to their respective sectors.

20. A computing system for generating a stock portfolio, comprising:
- a processor; and a memory storing instructions; said processor being configured to execute the instructions to perform the following steps:
  (1) store information of all stock that are constituents of a pre-selected universe of securities in a securities database, wherein the information comprises identity, growth data, and value data of a stock, as of a selection date;
  (2) score each of the stocks in the securities database using a plurality of growth and value factors to generate a growth score and a value score for each stock;
  (3) determine a selection score and style for each stock, wherein the style of each stock is either value or growth;
  (4) select eligible stocks for a target stock portfolio based on their styles determined in step (3), wherein only value stocks are eligible for a value stock portfolio, only growth stocks are eligible for a growth stock portfolio, and all stocks are eligible for a broad-based stock portfolio;
  (5) rank the stocks eligible for the target stock portfolio from the best to the worst selection scores;
  (6) eliminate a pre-determined percentage of the lowest ranking stocks;
  (7) divide the remaining stocks into a plurality of sub-groups based on their rankings; and
  (8) generate the target stock portfolio by weighting the remaining stocks according to the sub-groups they are in, wherein the sub-groups with higher rankings receive more weight within the target stock portfolio, and each stock is equally-weighted within its sub-group;
wherein step (3) comprises:
determining whether value and growth style classifications corresponding to the pre-selected universe of securities are available; and
if there are corresponding value and growth style classifications available,
  a first segment of stocks that are classified by the corresponding growth and value classifications solely as growth stocks are given their growth scores as their selection scores, and they are determined to be growth stocks,
  a second segment of stocks that are classified by the corresponding growth and value classifications solely as value stocks are given their value scores as their selection score, and they are determined to be value stocks, and
  a third segment of stocks that are allocated to both the growth and value classifications are given the better of their two scores, and determined to be value or growth stocks according to their better scores,
if there are no corresponding value and growth style classifications available, then each stock is given the better of its value and growth scores, and determined to be a value or growth stock according to its better score.

21. The computing system of claim 20, wherein the plurality of growth factors are selected from a group consisting of 3-month price appreciation, 6-month price appreciation, 12-month price appreciation, sales-to-price ratio, one year sales growth, one year change in return on assets, sustainable growth rate, one year earnings growth, one year cash flow growth, and market implied earnings surprise; and wherein the plurality of value factors are selected from a group consisting of book value-to-price ratio, cash flow-to-price ratio, return on assets, earnings to price ratio and dividend yield.

22. The computing system of claim 20, wherein step (2) comprises:
assigning a numeric growth or value rank to each stock for every growth factor and every value factor;
summing up all growth ranks of a stock to generate a numeric combined growth rank for each stock;
ranking all stocks in the pre-selected universe of securities based on their numeric combined growth ranks to determine the growth score of each stock;
summing up all value ranks of a stock to generate a numeric combined value rank for each stock; and
ranking all stocks in the pre-selected universe of securities based on their numeric combined value ranks to determine the value score of each stock.

* * * * *